Feb. 18, 1930. H. S. BELL 1,747,344
AEROPLANE STEERING MECHANISM
Filed Oct. 25, 1928  3 Sheets-Sheet 2
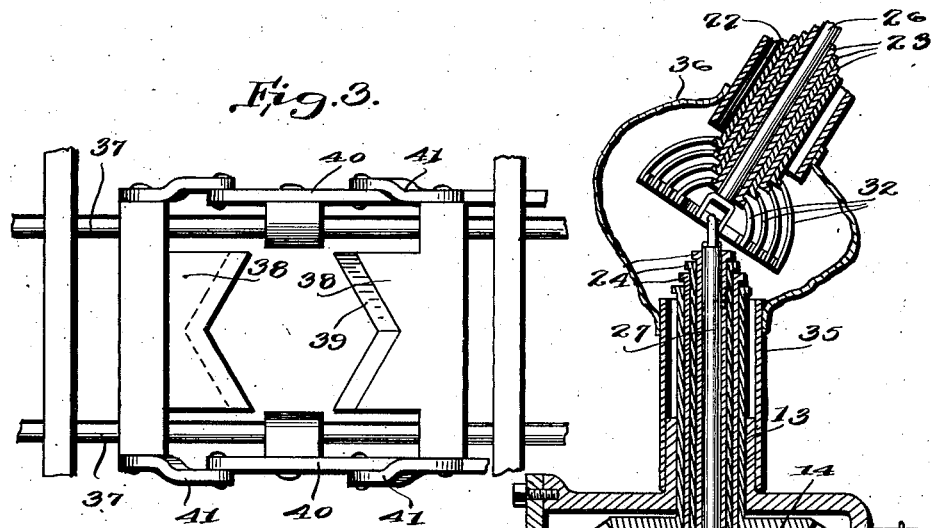
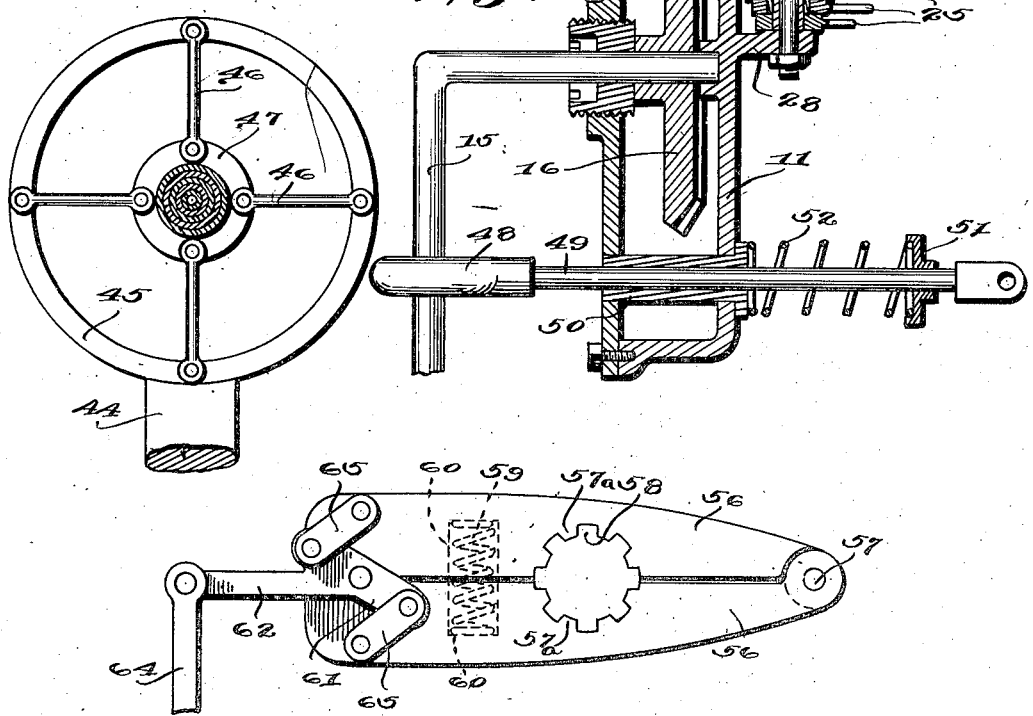
WITNESSES
C. B. Shillinger
INVENTOR
Harry S. Bell
BY Munn & Co.
ATTORNEY Feb. 18, 1930. H. S. BELL 1,747,344
AEROPLANE STEERING MECHANISM
Filed Oct. 25, 1928   3 Sheets-Sheet 3

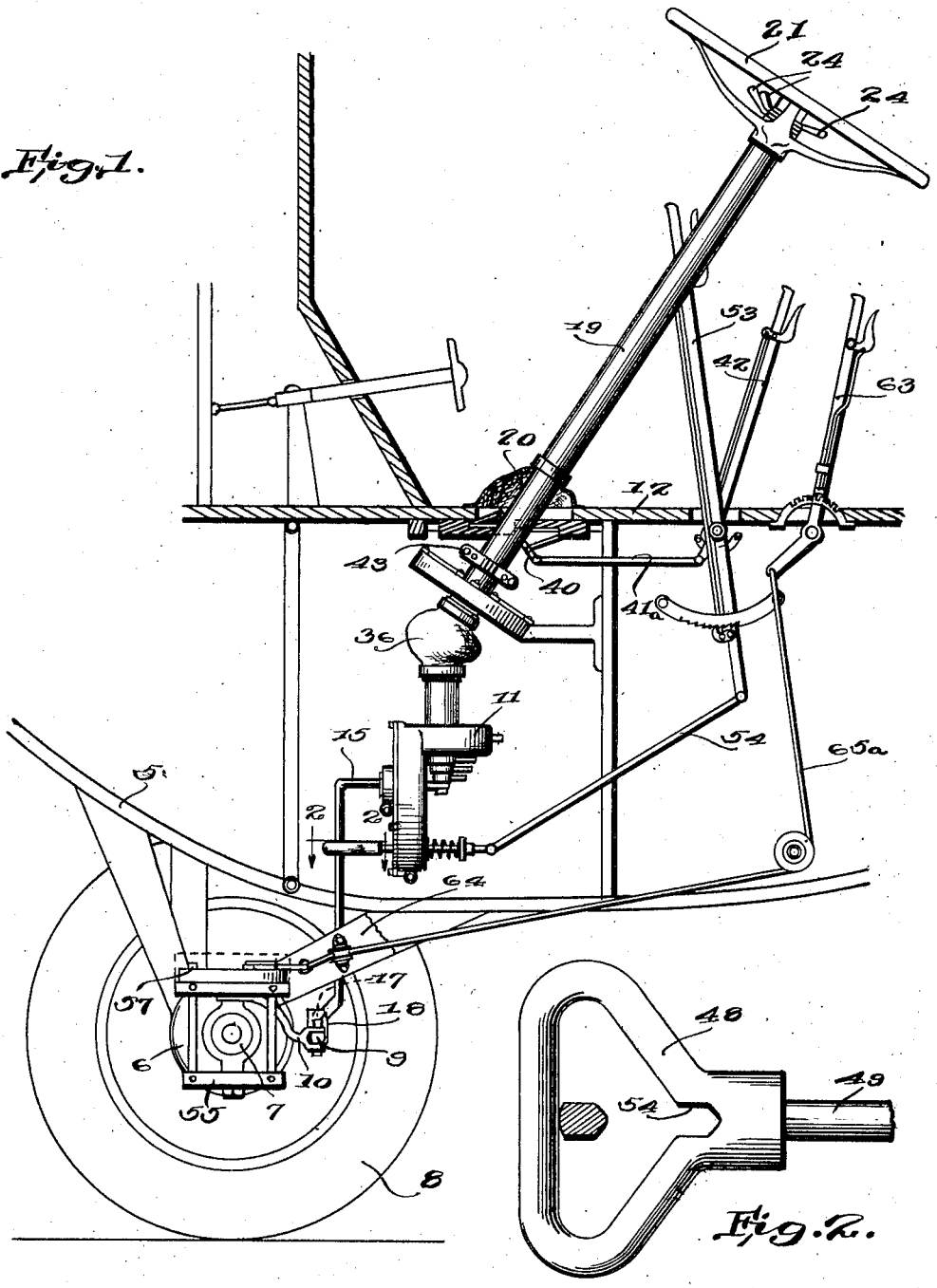

WITNESSES

INVENTOR
Harry S. Bell
BY
ATTORNEY

Patented Feb. 18, 1930

1,747,344

UNITED STATES PATENT OFFICE

HARRY STANTON BELL, OF PATERSON, NEW JERSEY

AEROPLANE STEERING MECHANISM

Application filed October 25, 1928. Serial No. 315,033.

My invention relates to steering gears and more particularly to a steering mechanism for aeroplanes.

An object of the present invention is to provide a combined aeroplane steering mechanism and joy stick whereby the aeroplane may be controlled in flight in the usual manner or steered on the ground.

The invention further provides a universally mounted steering post which, when desired, serves as the usual joy stick together with means for clamping the post against universal movement so that the mechanism may be readily brought into use for steering purposes.

Another object is to provide a manually operable means for normally locking the steering parts against movement so that the front aeroplane wheels will be held in landing position.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a fragmentary view of an aeroplane having my invention associated therewith;

Figure 2 is a detail view of the steering arm holding yoke and taken on line 2—2 of Figure 1;

Figure 3 is a top plan view of the steering post clamp embodied in the invention;

Figure 4 is an enlarged detail view partly in vertical section and partly in elevation;

Figure 5 is a top plan view of the yieldable steering post centralizing device embodied in the invention;

Figure 6 is a top plan view of the wheel spindle clamp embodied in the invention;

Figure 7:
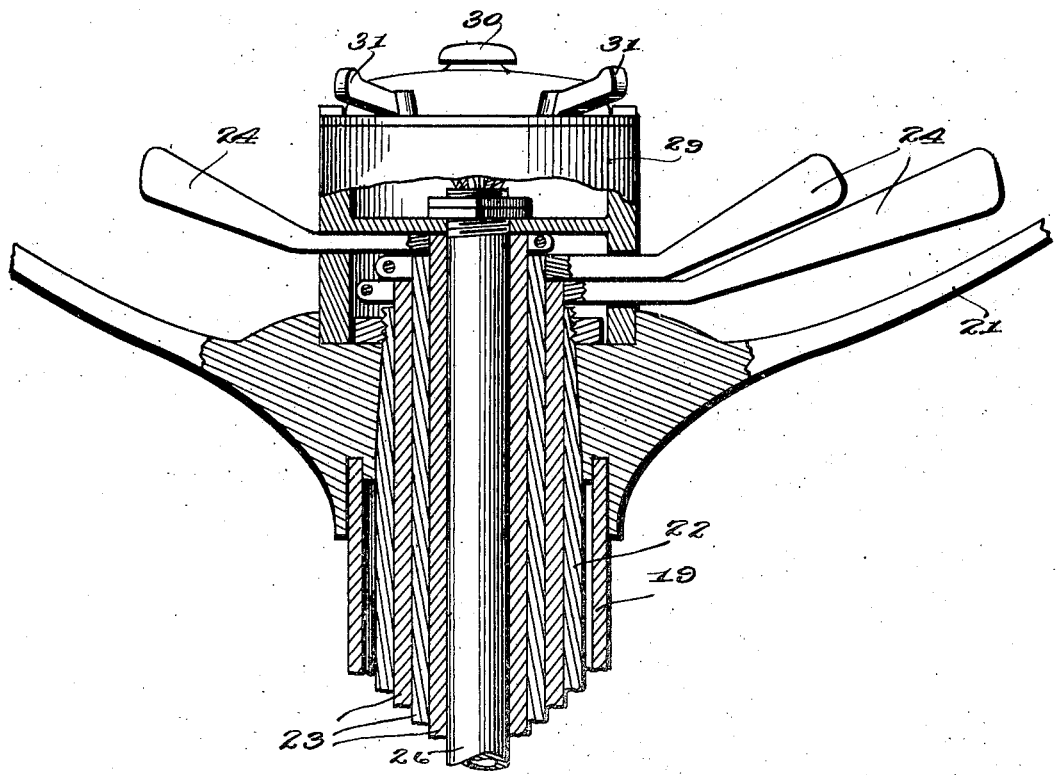
Figure 7 is an enlarged detail view partly in section and partly in elevation; and

Referring to the invention in detail a conventional aeroplane 5 equipped with a front axle 6 which extends transversely beneath the aeroplane is provided with wheel spindles 7 carrying ground engaging wheels 8.

A transversely shiftable steering rod 9 is arranged rearwardly of the axle 6 in parallel relation thereto and is operatively connected with the spindles by steering knuckle arms 10.

A gear housing 11 of inverted L-shaped configuration is supported within the aeroplane 5 above the steering rod 9 and below the aeroplane floor 12. Journalled in the horizontal leg of this casing and passing therethrough is a tubular steering column section 13 to which is fixed a bevelled gear 14, the latter being disposed within the housing.

An inverted L-shaped steering arm 15 has one end journalled in the vertical leg of the housing and fixed thereto and accommodated within this leg of the housing is a bevelled gear 16 meshing with the bevelled gear 14. The vertical leg of the arm 15 extends to the steering rod 9 and terminates in a ball or sphere 17 which is received in a universal socket 18 formed upon the rod 9.

Arranged above the casing 11 and normally disposed at an oblique angle with its lower end adjacent the steering column section 13 is a steering post 19. As illustrated in Figure 1 the steering post is universally mounted in a flexible hood 20 secured to the floor 12. A steering wheel 21 is revoluble upon the upper end of the steering post, and is fixed to a tubular steering column section 22 housed within the steering post.

In order to control an internal combustion engine from the steering wheel a plurality of concentric tubes 23 are received within the steering column section 22 and are independently rotatable. At their upper ends these tubes are equipped with control handles 24 for controlling the spark, gas, choke, etc., of an engine. A similar group of concentric tubes 24 are received in the steering column section 13 and are equipped with laterally projecting levers 25 for connection with the engine control parts. A central hollow shaft 26 passes through the innermost tube 23 while a similar shaft 37 passes through the tubes 24 and has its lower end secured within a lateral extension 28 formed on the gear housing. As illustrated in Figure 7 a suitable switch box

29 is mounted upon the upper end of the shaft 26 and is equipped with a horn button 30 and light and ignition levers 31.

Figure 8:
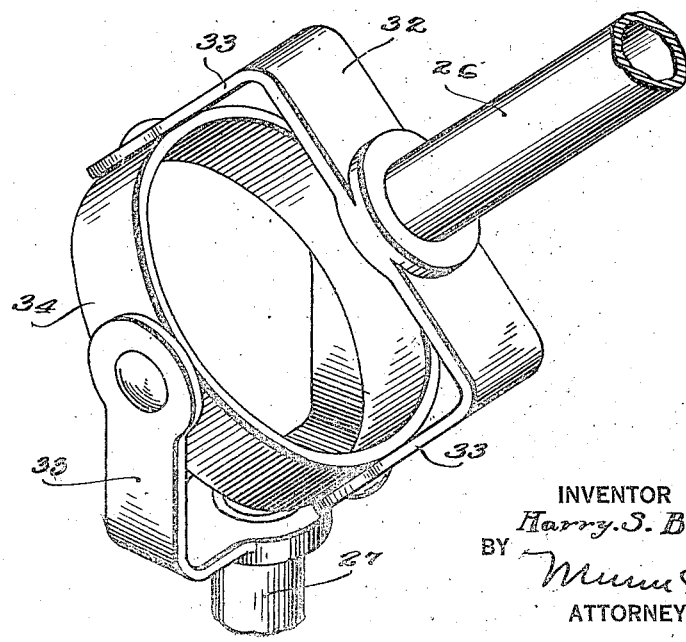
Figure 8 is a perspective of one of the universal joints embodied in the invention.

In order to operatively connect the coinciding parts contained in the steering post 22 and the steering column section 13 universal joints 32 are provided. A detail view of one of these universal joints is disclosed in Figure 8, and consists of pairs of opposed forks 33 arranged at right angles to each other and one pair pivotally supporting an annulus 34 to which the other pair of forks are pivoted at diametrically opposite points. A fixed cylindrical casing 35 rises from the gear housing and receives the upper portion of the steering column section 13. In order to protect the universal joints and parts with which they are associated a flexible covering 36 extends from the upper end of the housing 35 to the lower end of the steering post.

From the description thus far given it follows that upon rotation of the steering wheel the steering arm 15 will be rocked through the medium of the gears 14 and 16 and thereby shift the transversely shiftable rod 9 to turn the wheel spindles.

For the purpose of holding the steering post in steering position a vise or clamp particularly illustrated in Fig. 3 is provided. This clamp comprises a pair of parallel bars 37 which are supported upon the under face of the floor 13 upon opposite sides of the steering post. Opposed movable jaws 38 are slidably mounted upon these bars and have opposed V-shaped jaw faces 39 adapted to grip the steering post therebetween. Links 40 are pivoted upon the outer face of the bars 37 and have their ends pivoted to pairs of levers 41ᵃ which in turn are pivotally carried by the jaws 38. To operate the jaws 38 a hand lever 42 is pivotally supported on the floor 12 rearwardly of the steering post and has operative connection with one of the links 40 by means of a rod 41ᵃ having one end pivotally connected with the lever 42 and its opposite end pivotally connected with such link. It will be observed that upon shifting the hand lever in one direction the jaws will be moved away from each other and upon reverse movement of this hand lever these jaws will be moved into gripping engagement with the steering post to hold the same rigid.

It is proposed to utilize the steering post as a joy stick for controlling the aeroplane in flight. For this purpose a plurality of radially disposed arms 43 are provided on the lower end of the steering post and are adapted to be connected to flexible elements (not shown) leading to the various movable parts of the aeroplane. In order to normally maintain the steering post centralized when used as a joy stick a yieldable universally mounting disclosed in Figure 5 is provided. This mounting consists of a bracket 44 attached to the aeroplane body beneath the floor and carrying a ring or annulus 45 through which the lower end of the steering post extends. A plurality of radially disposed elastic elements 46 are attached to the upper edge of the ring 45, and have their inner ends attached to a collar or flange 47 fixed to the steering post. It will be observed that the post may be rocked universally within the ring 45 but that upon release of the post the elastic elements will return the latter to the normal angular position illustrated in Figure 1. While in this instance, the elastic elements 46 are disclosed as being formed of heavy elastic material, contractile springs may be employed, if desired.

For normal flight the steering arm 15 is held against movement so that the parts with which it is associated cannot accidentally move. For this purpose a V-shaped yoke 48 is received on the vertical part of the steering arm and is provided with a longitudinally extending shank 49 which is slidably mounted in a tubular guide 50 in the lower end of the gear housing. As particularly illustrated in Fig. 4 this shank projects laterally from the housing and carries a fixed washer 51. An expansible coil spring 52 encircles the projecting end of the shank and is engaged with the gear housing and washer to normally hold the yoke in inactive position. A hand lever 53 is mounted adjacent the lever 42 and has its lower end pivotally connected with an angularly extending actuating rod 54 having operative connection with the shank in advance of the coil spring 52. When it is desired to hold the steering arm against movement the yoke is shifted forwardly by manipulating the lever 43 to engage the arm within a recess 54 provided in one end of the yoke.

For normal flight means is provided for holding the wheels 8 parallel to the longitudinal axis of the aeroplane and comprises a rectangular frame 55 which is received on one of the wheel spindles 7. As illustrated in Fig. 6 a pair of clamping members 56 are supported in a horizontal plane upon the upper end of the frame and are pivotally connected together on the frame as at 57. Semicircular ribbed recesses 57ᵃ are provided in the opposite faces of the clamping members and embrace the ribbed upper end 58 of the wheel spindle. Normally the clamping members are urged apart by an expansible coil spring 59 accommodated in coinciding recesses 60 in the opposed faces of the clamping members adjacent their free ends. To actuate the jaws to gripping engagement with the wheel spindle a throw lever 61 is pivotally mounted upon the free end of one of the clamping members to swing about a vertical axis and is formed with a lateral arm 62 having operative connection with a hand lever 63 through the instrumentality of an actuating rod 64 and a cable 65ᵃ connected with this hand lever and rod 64. Parallel links 65 are connected with the ends of the throw lever 61 and the clamping members 56 so that upon rocking movement of the throw lever in one direction the clamping members will be thrown together to engage the ribbed recess with the wheel spindle. With the clamping members engaged with the wheel spindle it will be impossible for either of the wheel spindles to move about their axis and the wheels 8 will be positively held in parallel relation to the longitudinal axis of the aeroplane. However, when the steering mechanism is in use the lever 63 will be moved to a position to allow slack in the cable to permit the clamping members to separate under the influence of the spring 59.

What is claimed is:

1. In a combined joy stick and ground engaging wheel control, a universally mounted member, and manually operative clamping means for clamping the universally movable member in steering position, at will.

2. The combination with an aeroplane having a steering gear, of a joy stick, a steering column mounted in the joy stick and having operative connection with the steering gear, and means for holding the joy stick against movement when the steering gear is not in use.

3. The combination with an aeroplane having a steering gear, of a joy stick, a steering column mounted in the joy stick and having operative connection with the steering gear, and means for holding the joy stick against movement when the steering gear is not in use, and manually controlled means for latching the steering gear against movement while the joy stick is in operation.

4. The combination with an aeroplane having ground engaging steering wheels, of a hollow joy stick mounted in the aeroplane, a steering column revoluble in the joy stick and having operative connection with the ground engaging wheels, and means for clamping the joy stick in an angular position when it is desired to steer the ground engaging wheels.

5. The combination with an aeroplane having ground engaging steering wheels, of a steering arm operatively connected therewith, a universally mounted hollow joy stick supported above the steering arm, a steering column revoluble therein and having operative connection with the steering arm, means for holding the steering arm against movement when the joy stick is in use, and means for holding the joy stick in fixed relation with the aeroplane when it is desired to steer the ground engaging wheels.

6. The combination with an aeroplane having ground engaging steering wheels, of a steering arm operatively connected therewith, a universally mounted hollow joy stick supported above the steering arm, a steering column revoluble therein and having operative connection with the steering arm, means for holding the steering arm against movement when the joy stick is in use, and means for holding the joy stick in fixed relation with the aeroplane when it is desired to steer the ground engaging wheels, and means for normally holding the ground engaging wheels in parallelism to the longitudinal axis of the aeroplane for normal flight.

7. In combination, an aeroplane, ground engaging steering wheels therefor, a steering arm operatively connected with the steering wheels, a hollow joy stick supported above the steering arm, a steering post revoluble therein and having operative connection with the steering arm, a manually releasable yoke normally engaged with the steering arm to hold the latter against movement, and means for holding the joy stick at an angle when it is desired to steer the ground engaging wheels.

8. In a combined aeroplane joy stick and ground engaging steering wheel control, a universally mounted tubular member, a steering column revoluble therein, and means for holding the tubular member in steering position when desired.

9. In a combined aeroplane joy stick and ground engaging steering wheel control, a universally mounted tubular member, a steering column revoluble therein, coacting clamps supported upon opposite sides of the tubular member, and an actuating lever operatively connected with the clamps for moving them into and out of engagement with the tubular member.

10. In an aeroplane control device, a universally mounted tubular member connected with the movable parts of an aeroplane, and a plurality of independently rotatable nested tubes within the universally mounted member for operative connection with a steering arm and internal combustion engine control parts, and a manually operative clamp engageable with the universally mounted tubular member to hold the same in fixed relation to the aeroplane when desired.

11. In an aeroplane control device a universally mounted tubular member for operative connection with movable parts of an aeroplane, means for holding the tubular member in fixed relation to the aeroplane when desired, a plurality of independently rotatable nested tubes in the tubular member, a set of independently rotatable nested tubes below the first mentioned tubes, and universal sections between the adjacent ends of the corresponding nested tubes.

12. In an aeroplane control device a universally mounted tubular member for operative connection with movable parts of an aeroplane, means for holding the tubular member in fixed relation to the aeroplane when desired, a plurality of independently rotatable nested tubes in the tubular member, a set of independently rotatable nested tubes below the first mentioned tubes, and universal sections between the adjacent ends of the corresponding nested tubes, a steering arm mounted for oscillatory movement below the second set of tubes and operated from one of the latter.

13. In an aeroplane control device a universally mounted tubular member for operative connection with movable parts of an aeroplane, means for holding the tubular member in fixed relation to the aeroplane when desired, a plurality of independently rotatable nested tubes in the tubular member, a set of independently rotatable nested tubes below the first mentioned tubes, and universal sections between the adjacent ends of the corresponding nested tubes, a steering arm mounted for oscillatory movement below the second set of tubes and operated from one of the latter, a longitudinally movable normally inactive latch element associated with the steering arm, and manually operable to engage and hold the steering arm against movement, at will.

14. In a combined aeroplane control and steering mechanism, an aeroplane having ground engaging steering wheels, a hollow joy stick, means for holding the latter in fixed relation to the aeroplane when the ground engaging wheels are to be steered, a steering column revoluble in the joy stick, a steering arm operatively connected with the steering wheels and column, a slidably mounted yoke through which the arm passes and having a recess at one end, and a hand lever operatively connected with the yoke for fixing the same to a position to engage the recess with the arm thereby hold the latter against rocking movement while the aeroplane is in normal flight.

15. In a combined aeroplane control and steering mechanism, an aeroplane having ground engaging steering wheels, a hollow joy stick, means for holding the latter in fixed relation to the aeroplane when the ground engaging wheels are to be steered, a steering column revoluble in the joy stick, a steering arm operatively connected with the steering wheels and column, a slidably mounted yoke through which the arm passes and having a recess at one end, and a hand lever operatively connected with the yoke for fixing the same to a position to engage the recess with the arm and thereby holding the latter against rocking movement while the aeroplane is in normal flight, and means for holding the ground engaging wheels in parallelism to the longitudinal axis of the aeroplane for normal flight.

16. The combination with an aeroplane having a pair of wheel spindles supported beneath the same, and a steering mechanism connected therewith, a pair of clamping members supported above one of the spindles and receiving one end of the latter therebetween, and manually operative means associated with the clamping members for moving them into corresponding engagement with the spindle and thereby holding both spindles against pivotal movement for normal aeroplane flight.

17. The combination with an aeroplane having a pair of wheel spindles supported beneath the same, and a steering mechanism connected therewith, a ribbed extension on one of the spindles, normally separated ribbed jaws embracing the extension and manually operable means for moving the jaws towards each other to grip the ribbed extension and thereby hold both spindles against rotation for normal aeroplane flight.

18. In combination, an aeroplane joy stick, a fixed annulus through which one end of the joy stick passes, and a plurality of yieldable connections between the annulus and joy stick for normally maintaining the latter in centralized position.

19. In a steering mechanism, a vehicle equipped with ground engaging steering wheels, a gear housing supported above the latter, a steering post connected with one of such gears, a steering arm fixed to the other of such gears and operatively connected with the steering wheels, a yoke slidably mounted in the gear housing through which the steering arm passes, and manually operable means for shifting the yoke to a position to engage the steering arm to hold the latter stationary when desired.

20. In a steering mechanism, a vehicle equipped with ground engaging steering wheels, a gear housing supported above the latter, a steering post connected with one of such gears, a steering arm fixed to the other of such gears and operatively connected with the steering wheels, a yoke slidably mounted in the gear housing through which the steering arm passes, manually operable means for shifting the yoke to a position to engage the steering arm to hold the latter stationary when desired, and a spring engaging the yoke and normally urging the latter to inactive position.

HARRY STANTON BELL.